United States Patent [19]

Lin

[11] Patent Number: 4,994,163
[45] Date of Patent: Feb. 19, 1991

[54] ROTATABLE WASTEWATER METAL-RECLAIMATION DEVICE

[76] Inventor: Sheng R. Lin, No. 111, Sec. 3, Hsi Men Rd., Tainan, Taiwan

[21] Appl. No.: 521,520

[22] Filed: May 10, 1990

[51] Int. Cl.⁵ .............................................. C02F 1/46
[52] U.S. Cl. .................................................. 204/213
[58] Field of Search ........................................ 204/213

[56] References Cited

U.S. PATENT DOCUMENTS 4,159,235 6/1979 Kammel ............................. 204/213

Primary Examiner—T. M. Tufariello
Attorney, Agent, or Firm—Browdy and Neimark

[57] ABSTRACT

A wastewater metal-reclaimation device which includes a containment vessel, a fixed frame and a rotor assembly. The fixed rotatably supports the rotor assembly and has a rotor shaft on it which is driven indirectly by an electric water. The rotor assembly includes two large rotor gears, a number of cathode rods and inner and outer hexagonal mixing surfaces which are perforated. The rotor assembly is rotatable about a perforated cylindrical anode and driven to rotate by the rotor shaft. Wastewater enters the containment vessel via a wastewater inlet which feeds the cylindrical anode and then is mixed via the inner and outer mixing surfaces.

2 Claims, 6 Drawing Sheets

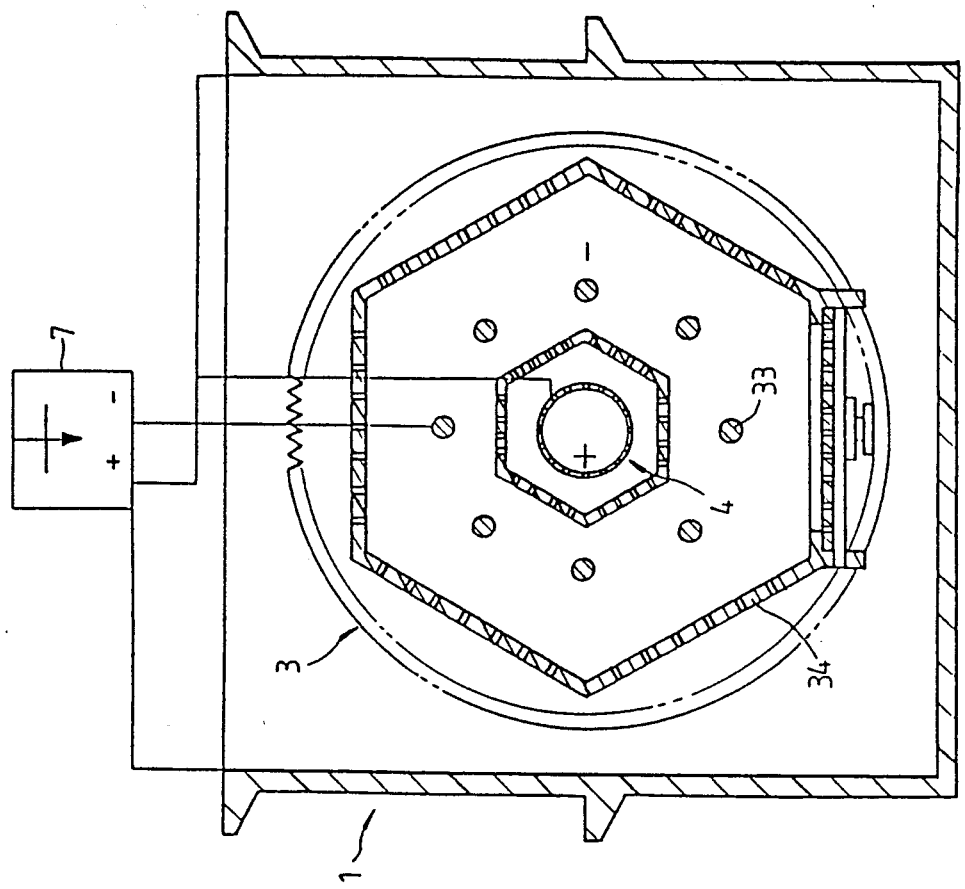

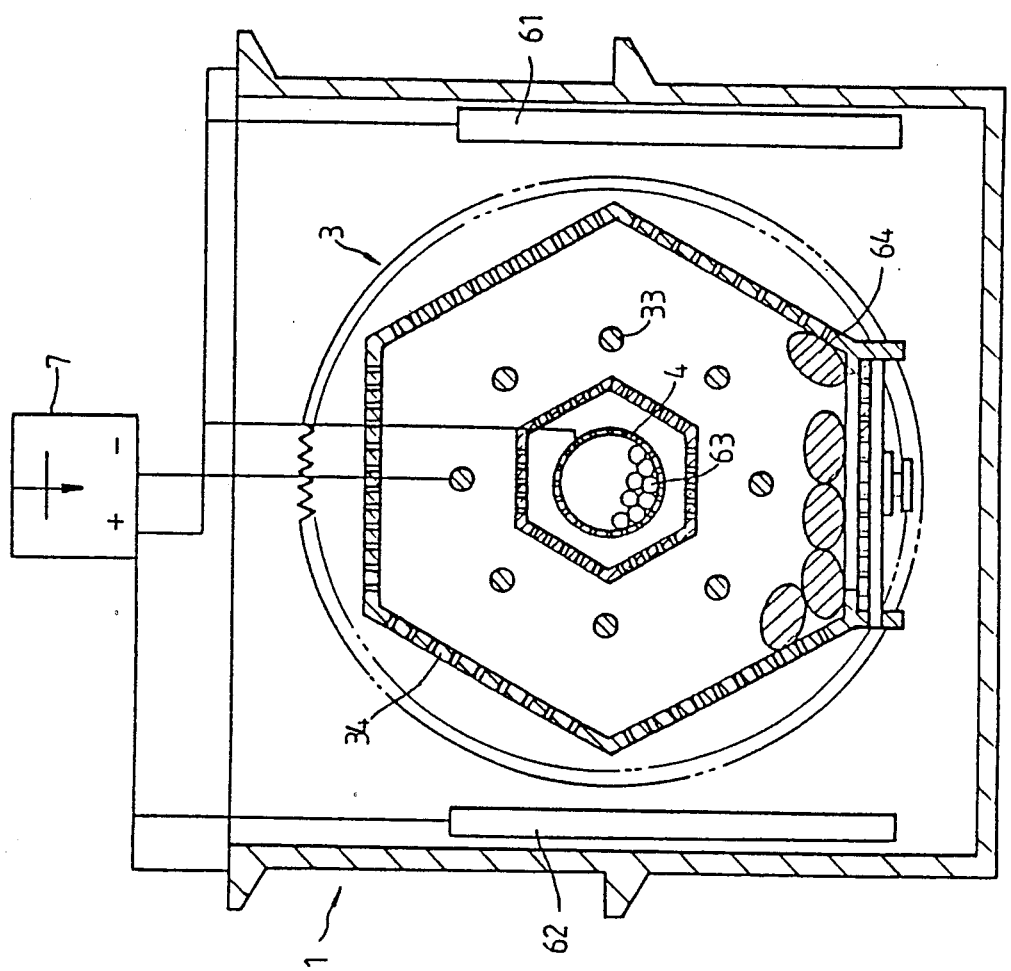

ROTATABLE WASTEWATER METAL-RECLAIMATION DEVICE

BACKGROUND OF THE PRESENT INVENTION

The present invention generally relates to reprocessing or reclaimation of metals from wastewater and more particularly relates to a wastewater metal reclaimation device incorporating electroplating techniques in a rotatable assembly.

Often wastewater is poured into the environment with little or no treatment thereof, thereby causing the twin problems of polluting the enviroment and wasting precious resources. This is especially true of wastewater including idle or unreclaimed metals. Once these metals are dispelled into the enviroment, it is virtually impossible to reclaim them, and when possible, it is usually cost-prohibative to do so. Therefore, it would be desirable to reclaim these metals before they go into the enviroment. One conventional metal reclaimation device is the settling tank, which allows the heavier metals or compounds thereof to settle to the bottom of a stationary tank. Unfortunately, settling vessels are slow and very limited in the capacity of water which can be processed in a certain amount of time.

It is the purpose of this invention, therefore, to mitigate and/or obviate the above-mentioned problems by providing the rotatable wastewater metal-reclaimation device set forth in the detailed description of the preferred embodiment.

SUMMARY OF THE PRESENT INVENTION

A primary objective of the present invention is to provide a wastewater metal-reclaimation device with rotatable anode and cathodes.

Another objective of the present invention is to provide such a wastewater metal-reclaimation device which is both time-saving and cost-effective.

Still another objective of the present invention is to increase mass transfer of electrolytes and to decrease the metal activation potential in the wastewater being processed.

These and additional objectives, if not set forth specifically herein, will be readily apparent to those skilled in the art from the detailed description provided hereinbelow, with appropriate reference to the accompanying drawings.

DETAILED DESCRIPTION OF THE DRAWINGS

FIG. 5 is a view similar to FIG. 3, excluding the fixed frame assembly and showing the direction of the current flow therein; and FIG. 6 is a view similar to FIG. 5, illustrating a second embodiment of the present invention, in which the cylindrical anode is used as an anode basket and the outer mixing surface is used as a container for electroplating material.

DETAILED DESCRIPTION OF THE PREFERRED EMBODIMENT

Figure 1:
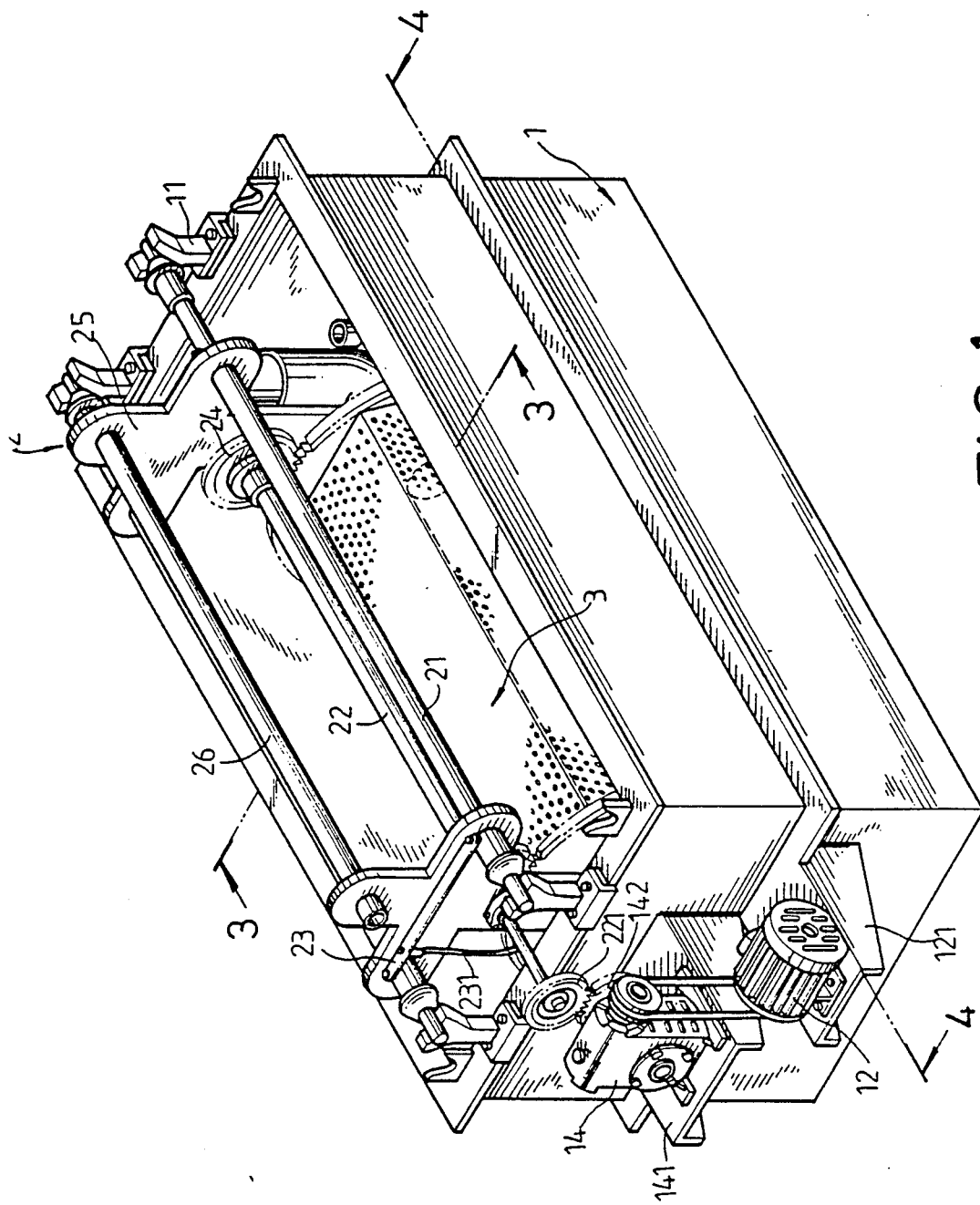
FIG. 1 is a perspective view of the rotatable wastewater metal-reclaimation device of the present invention.
Figure 2:
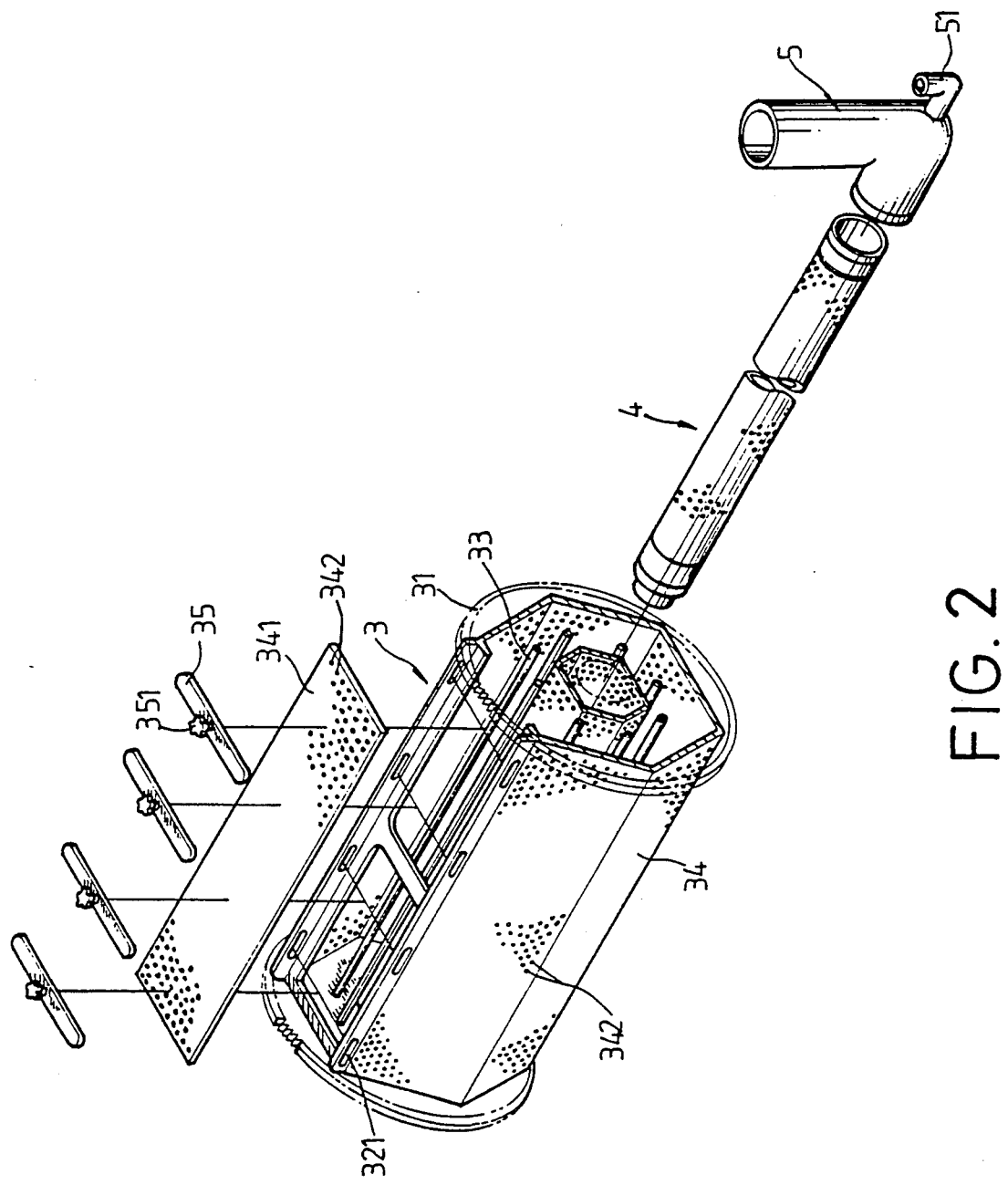
FIG. 2 is a perspective view of the cathode wheel of the device of FIG. 1.

Referring to FIGS. 1-5, and in particular referring to FIG. 1 and 2, it can be seen that the rotatable wastewater metal reclaimation device of the present invention comprises the combination of: a containment vessel 1 for containment of wasterwater (with ionic metal wastes therein), a fixed frame assembly 2, an electrolytic rotor assembly 3, a rotatable cylindrical anode 4, a wastewater inlet 5, and a D.C. voltage source 7 (see FIG. 5).

The containment vessel 1 is substantially rectangular and open at its upper end. There are two platforms 121 and 141 extending from the outer surface of a lateral wall of the containment vessel 1 on which a side motor 12 and a variable velocity machine 14 are respectively fixed. The electric motor 12 is mechanically linked to the variable velocity machine 14 via a drive belt 13 and the variable velocity machine 14 has a driving gear 142 proximate to the side wall of the containment vessel 1.

The fixed frame assembly 2 comprises two substantially cross-shaped plates 25 which are connected by a handling bar 26 at respective upper ends thereof and two support rods 21 at respective horizontal ends thereof. The handling bar 26 and the support rods 21 are parallel to each other, with a conduction piece 23 being attached to each of the corresponding ends of the support rods 21 proximate to the outer surface of the cross-shaped plate 25. Each of the conduction pieces 23 has a respective conduction wire 231 fixed thereto which is connected to a respective end of the cylindrical anode 4 so that flow of electrical charge is facilitated therebetween through the support rods 21. That is to say that the support rods 21 are conductive, so as to create a short circuit between the two ends of the cylindrical anode 4. A rotor shaft 22 is rotatably fixed to the cross-shaped plates 25 slightly below the horizontal portions thereof, with one distal end of the rotor shaft 22 having an intermediate gear 221 thereon which engages with and is driven by the driving gear 142.

Figure 3:
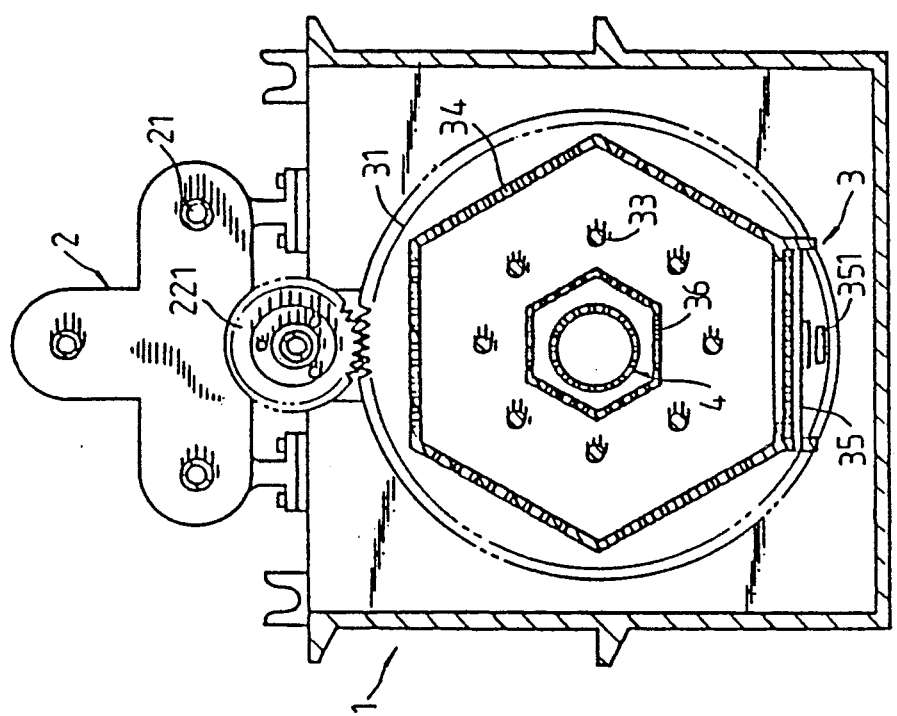
FIG. 3 is an elevational cutaway view of the device of FIG. 1, as seen along line III—III of FIG. 1.
Figure 4:
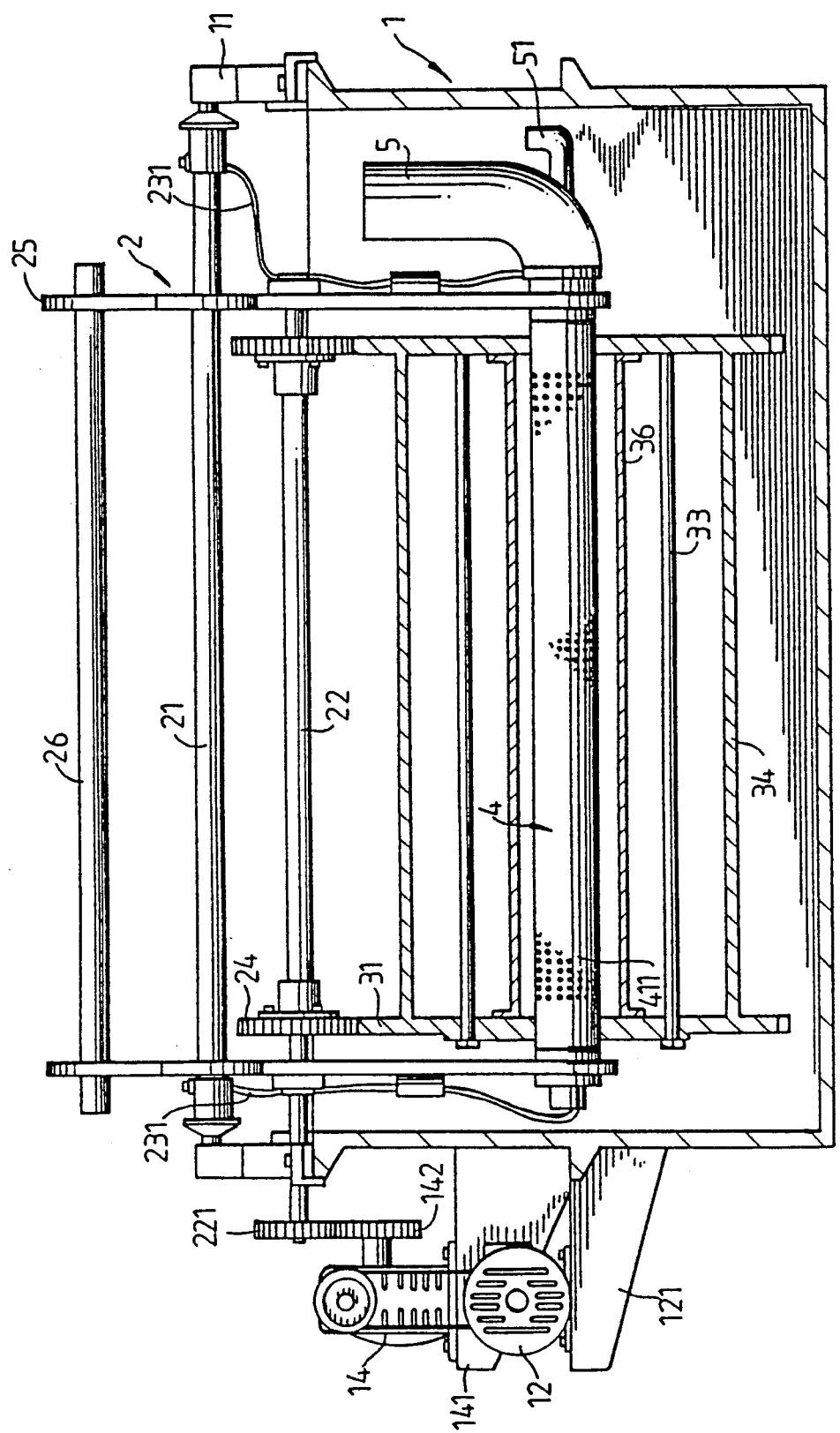
FIG. 4 is another cutaway view of the device of FIG. 1, as seen along line IV—IV of FIG. 1.

As best seen from FIG. 2-4, the electrolytic rotor assembly 3 comprises two large rotor gears 31, a plurality of cathode rods 33, inner and outer hexagonal mixing surfaces (36 and 34), and a cylindrical anode 4. The inner and outer hexagonal mixing surfaces (36 and 34) each have a respective multiplicity of openings (362 and 342) thereon, allowing the wastewater to flow therethrough. The cylindrical anode 4 also has a multiplicity of openings 41 thereon through which water from the wastewater inlet 5 enters into the containment vessel 1. The cross-shaped plates 25 rotatably support the cylindrical anode 4 at its respective lower ends thereof. The cylindrical anode 4 rotatably supports the rotor gears 31 so that the rotor gears 31 engage with and are rotatably driven by the shaft gears 24. As the rotor gears 31 rotate, the entire electrolytic rotor assembly 3 rotates along with it. The above-mentioned mixing surfaces (36 and 34) serve to increase mixing of the wastewater, thereby facilitating the depositing of waste metals (which were originally in ionic form in the wastewater) onto the cathode rods 33. Of course, after the waste metal starts depositing on the cathode rods 33, the metal activation potential of the wastewater is lowered. Respective ends of each of the plurality of cathode rods 33 are fixed on opposing rotor gears 31, with the cathode rods 33 being parallel with each other and being evenly spaced and concentric with the cylindrical anode. The rotor gears 31 are driven to rotate by respective the shaft gears 24.

From FIG. 5, it can be understood that the D.C. voltage source 7 causes current to flow from the cylindrical anode 4 to the cathode rods 33 so that the activation potential in ionic metal wastes in the wastewater is lowered by causing deposits to form on the cathode rods 33. Because in practice various D.C. voltage sources could be used, the actual physical structure of the D.C. voltage source 7 of the present invention is not shown in FIGS. 1-4. However, it should suffice to say that the present invention comprises a D.C. voltage source which causes a voltage drop between the cylindrical anode 4 and the cathode rods 33.

The present invention can also be used for more conventional electroplating purposes, as can be understood best from FIG. 6. The cylindrical anode 4 in that case could be used as an anode basket (containing soluble metallic material 63) and the outer mixing surface could be used to contain the mandrel 64 (the material to be electroplated), with two electrodes (61 and 62) being used as in conventional electroplating with non-soluble anode plates 33 and cathode plates 32.

While the present invention has been explained in relation to its preferred embodiment, it is to be understood that various modifications thereof will be apparent to those skilled in the art upon reading this specification. For example, the mixing surfaces (362 and 342) could be octogonal rather than hexagonal, etc. Therefore, it is to be understood that the invention disclosed herein is intended to cover all such modifications as shall fall within the scope of the appended claims.

I claim:

1. A rotatable wastewater metal reclaimation device comprising the combination of: a containment vessel (1) for containment of wastewater with ionic metal wastes therein, a fixed frame assembly (2), an electrolytic rotor assembly (3), a rotatable cylindrical anode (4), a wastewater inlet (5), and a D.C. voltage source (7);

said containment vessel (1) being substantially rectangular (1) and open at an upper end thereof, said containment vessel (1) having two platforms (121 and 141) extending from an outer surface of a side wall thereof on which an electric motor (12) and a variable velocity machine (14) are respectively fixed, said electric motor (12) being mechanically linked to said variable velocity machine (14) via a drive belt (13), said variable velocity machine (14) having a driving gear (142) proximate to said side wall of said containment vessel (1);

said fixed frame assembly (2) comprising two substantially cross-shaped plates (25) which are connected by a handling bar (26) at respective upper ends thereof and two support rods (21) at respective horizontal ends thereof, said handling bar (26) and said support rods (21) being parallel to each other, two conduction pieces (23) being attached to corresponding ends of said support rods (21) proximate to an outer surface of said cross-shaped plate (25), each said conduction piece (23) having a respective conduction wire (231) fixed thereto which is connected to a respective end of said cylindrical anode so that flow of electrical charge is facilitated therebetween, a rotor shaft (22) rotatably fixed to said cross-shaped plate (25) slightly below said horizontal portions thereof, one distal end of said rotor shaft (22) having an intermediate gear (221) thereon which engages with and is driven by said driving gear (142);

said electrolytic rotor assembly (3) comprising two large rotor gears (31), a plurality of cathode rods (33), inner and outer hexagonal mixing surfaces (36 and 34), and a cylindrical anode (4) with multiplicity of openings (41) thereon for allowing said wastewater to flow therethrough; said cylindrical anode (4) being rotatably supported by said cross-shaped plate (25) at a lower end thereof, said cylindrical anode (4) rotatably supporting said rotor gears (31) so that said rotor gears (31) engage with and are rotatably driven by said shaft gears (24), said inner and outer hexagonal mixing surfaces (36 and 34) each having a respective multiplicity of openings (362 and 342) thereon, respective ends of each of said plurality of cathode rods (33) being fixed on said rotor gears (31), said cathode rods (33) being parallel with each other and being evenly spaced concentric with said cylindrical anode, said rotor gears (31) being driven to rotate by respective said shaft gears (24);

said D.C. voltage source (7) causing current to flow from said cylindrical anode (4) to said cathode rods (33) so that an activation potential in ionic metal wastes in said wastewater is lowered by causing deposits to form on said cathode rods 33.

2. A rotatable wastewater reclaimation device as set forth in claim 1, wherein: a non-soluble anode (33) and a cathode plate (32) are charge by said D.C. current source (7), said cylindrical anode (4) being used as an anode basket and said outer hexagonal mixing surfaces (36) being used to contain one or more mandrels.

* * * * *